(12) United States Patent
Shimizu

(10) Patent No.: US 6,378,850 B1
(45) Date of Patent: Apr. 30, 2002

(54) FLUID-FILLED VIBRATION DAMPING DEVICE HAVING IMPROVED PARTITION STRUCTURE

(75) Inventor: Yorishige Shimizu, Iwakura (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 09/633,629

(22) Filed: Aug. 7, 2000

(30) Foreign Application Priority Data

Sep. 6, 1999 (JP) ............................................. 11-251717

(51) Int. Cl.$^7$ ................................................ F16F 13/00
(52) U.S. Cl. ................................... 267/140.13; 267/219
(58) Field of Search .................. 267/140.11, 140.13, 267/140.14, 140.15, 219, 35; 248/526, 636, 638

(56) References Cited

U.S. PATENT DOCUMENTS

| | | | | |
|---|---|---|---|---|
| 5,143,358 A | * | 9/1992 | Hibi et al. ............. | 267/140.13 |
| 5,145,156 A | | 9/1992 | Muramatsu et al. ... | 267/140.14 |
| 5,183,243 A | * | 2/1993 | Matsumoto ............ | 267/140.13 |
| 5,240,233 A | * | 8/1993 | Kato et al. ............. | 267/140.13 |
| 5,259,598 A | * | 11/1993 | Hibi et al. ............. | 267/140.13 |
| 5,499,799 A | | 3/1996 | Kojima ................... | 267/140.13 |
| 6,053,487 A | | 4/2000 | Yotani et al. .......... | 267/140.11 |

FOREIGN PATENT DOCUMENTS

| | | |
|---|---|---|
| JP | A 4-262142 | 9/1992 |
| JP | 7-56314 | 6/1995 |
| JP | 10-252813 | 9/1998 |

* cited by examiner

Primary Examiner—Christopher P. Schwartz
Assistant Examiner—Mariano Sy
(74) Attorney, Agent, or Firm—Rossi & Associates

(57) ABSTRACT

Fluid-filled vibration damping device having a primary fluid chamber partially defined by an elastic body elastically connecting two spaced-apart mounting members and located on one of opposite sides of a partition structure having an orifice passage, an auxiliary fluid chamber partially defined by a flexible diaphragm and located on the other side of the partition structure, wherein the partition structure comprising an orifice including a pair of metallic annular components by pressing and are superposed on each other in an axial direction thereof so as to define therebetween the orifice passage, the pair of annular components being fixed together such that an inner peripheral portion of one annular components is bent to form a calking part which is calked to an inner peripheral portion of the other annular member over an entire inner circumference of the orifice member, and the flexible rubber plate being bonded at an peripheral portion thereof to a surface of the calking part in a process of vulcanization of a rubber material to form said flexible rubber plate.

16 Claims, 4 Drawing Sheets

FLUID-FILLED VIBRATION DAMPING DEVICE HAVING IMPROVED PARTITION STRUCTURE

BACKGROUND OF THE INVENTION

1. Field of the Invention

The present invention relates generally to a fluid-filled vibration damping device having a fluid chamber filled with a non-compressible fluid and constructed to provide a vibration damping effect based on flows of the fluid in the fluid chamber. More particularly, the present invention is concerned with such a fluid-filled vibration damping device which is novel in construction and suitably used in an engine mount, a body mount or other mounts for an automotive vehicle.

2. Description of the Related Art

As one type of a vibration damping device, such as a vibration damping coupling (bushing) or mount, which is interposed between two members of a vibration system for flexibly connecting these two members or mount one of these members on the other member in a vibration damping manner, there is know a fluid-filled vibration damping device which includes a first mounting member and a second mounting member which are spaced apart from each other and which are elastically connected to each other by an elastic body that partially defines a primary fluid chamber filled with a non-compressible fluid. The damping device further includes a partition structure supported by the second mounting member and flexible diaphragm which partially defines an auxiliary fluid chamber also filled with the non-compressible fluid, the volume of which is variable. The primary and auxiliary fluid chambers are located on the opposite sides ofthe partition structure, respectively, and communicated with each other through an orifice passage formed through the partition structure. Upon application of vibrational loads between the first and second mounting members, a pressure of the fluid in the primary fluid chamber changes due to elastic deformation of the elastic body, generating a pressure difference ofthe fluid between the primary and auxiliary fluid chambers. Based on this pressure difference of the fluid, the non-compressible fluid forcedly flows through the orifice passage between the primary and auxiliary fluid chambers, so that the vibration damping device exhibits an excellent vibration damping effect with ease, owing to resonance or flow of the fluid flowing through the orifice passage, which vibration damping effect is not attained by a non-fluid-filled type vibration damping device whose damping effect owing to only an elasticity of an elastic body thereof. In the light of this excellent vibration damping effect, the fluid-filled vibration damping device has been used as an engine mount for an automotive vehicle, for example.

Such a known fluid-filled vibration damping device as described above suffers from a problem of a significant increase of its dynamic spring constant upon application of vibrations having a frequency band higher than the frequency band to which the orifice passage is tuned, due to a significant increase of resistance to the fluid flow through the orifice passage. As a method to cope with this problem, it is proposed to constitute the partition structure by a combination of an annular orifice member which is fixedly supported by the second mounting member and which has an orifice passage extending in its circumferential direction along an inner circumferential surface of the second mounting member, and a flexible rubber plate which is supported at its peripheral portion by the inner peripheral portion of the annular orifice member such that the center opening of the orifice member is fluid tightly closed by the flexible rubber plate, for example. The thus constructed partition structure permits an effective formation of the orifice passage formed therein so as to extend its circumferential direction thereof, while allowing a substantive flow of the fluid between the primary and auxiliary fluid chambers, owing to the elastic deformation of the flexible rubber plate, upon application of a high frequency vibration. Therefore, the fluid-filled vibration damping device equipped with such a partition structure can exhibit its reduced dynamic spring constant, resulting in avoiding or reducing the undesirable significant increase of the dynamic spring constant of the device.

For fluid-tightly closing the center opening of the annular orifice member with the flexible rubber plate, JP-A-10-252813 disclosing a partition structure wherein the orifice member is constituted by a thick annular block member and the flexible rubber plate which is bonded at its peripheral portion to the inner circumferential surface of the orifice member. The orifice member in the form of the annular block has an inner circumferential surface whose area is enough large so that the flexible rubber plate is bonded to the inner circumferential surface of the orifice member with a sufficiently large bonding area. However, the orifice member needs to be formed of a metallic material by cutting or die-casting, resulting in low-efficiency and increased cost of manufacture of the orifice member.

Another partition structure of the fluid-filled vibration damping device is disclosed in JP-B-7-56314 wherein the partition structure is constituted by a combination of a plurality of metallic plates which are superposed on each other in the axial direction of the device in which the first and second mounting members are spaced apart from each other, and are fixedly secured together by press-fitting or welding. The metallic plates are partially bent so as to form the inner circumferential surface to which the outer periphery of the flexible rubber plate is bonded. This arrangement permits both of a sufficiently large bonding area of the flexible rubber plate and a efficient and economical manufacture of the orifice member by use of the metallic plates which are available at a relatively low cost and which permit excellent productivity. However, the partition structure consisting of the mutually press-fitted metallic plates may suffer from a problem of difficulty to assure with high stability a sufficient bonding strength at the interfaces of the metallic plates. On the other hand, the partition structure consisting of the mutually welded metallic plates may possibly suffer from a problem of deterioration or change of the property of the flexible rubber plates due to an adverse effect of heat upon welding the metallic plates to form the partition structure. Therefore, the conventional fluid-filled vibration damping device suffers from a problem of significant difficulty to assure a desired fixing strength of the orifice member and a desired elasticity of the flexible rubber plate, with high stability.

SUMMARY OF THE INVENTION

It is therefore an object of the invention to provide a fluid-filled vibration damping device having a partition structure which is novel in construction and easy and economical to manufacture, and which assures a sufficiently large bonding area of a flexible rubber plate with respect to an orifice member of the partition structure. The partition structure also permits a desired fixing strength of an orifice member, while exhibiting a desired elasticity of the flexible rubber plate with high stability.

The above object may be achieved according to the following modes of the invention each of which is numbered like the appended claims and depends from the other mode or modes, where appropriate, to indicate possible combinations of elements or technical features of the invention. However, it is to be understood that the present invention is not limited to those modes of the invention and combinations of the technical features, but may be otherwise recognized based on the thought of the present invention that disclosed in the whole specification and drawings or that may be recognized by those skilled in the art in the light of the disclosure in the whole specification and drawings.

(1) A fluid-filled vibration damping device comprising: a first mounting member and a second mounting member which are spaced-apart from each other, the second mounting member having a cylindrical portion open to the first mounting member; an elastic body elastically connecting the first and second mounting members and partially defining a primary fluid chamber filled with a non-compressible fluid; a partition structure which includes an annular orifice member having a central hole and being fixedly supported by the second mounting member, while defining an orifice passage extending along an inner circumferential surface of the cylindrical portion of the second mounting member in a circumferential direction thereof, and a flexible rubber plate fluid-tightly closing the central hole of the orifice member, the partition structure partially defines the primary fluid chamber on one of opposite sides thereof; and a flexible diaphragm partially defining an auxiliary fluid chamber which is filled with the non-compressible fluid, held in fluid communication with the primary fluid chamber through the orifice passage, and located on the other side of the partition structure which is remote from the primary fluid chamber, the orifice member including a first and a second annular components which are made of a metallic material by pressing and are superposed on each other in an axial direction thereof so as to define therebetween the orifice passage, the first and second annular components being fixed together such that an inner peripheral portion of the first annular component is bent to form a calking portion which is calked to an inner peripheral portion of the second annular member over a substantially entire inner circumference of the orifice member, the flexible rubber plate being bonded at an peripheral portion thereof to a surface of the calking portion in a process of vulcanization of a rubber material to form the flexible rubber plate.

In the fluid-filled vibration damping device according to the first mode (1) of this invention described above, the orifice member for defining the orifice passage for fluid communication between the primary and auxiliary fluid chambers, is constituted by first and second annular components which are fitted together by calking. This arrangement permits an improved efficiency and reduced cost of manufacture of the orifice member, in comparison with a conventional orifice member which is formed by cutting or die-casting. In addition, the present orifice member assures a sufficiently large strength thereof, in comparison with the conventional orifice member whose components are press-fitted to each other, while being free from a conventionally experienced problem such as a damage of the flexible rubber plate by heat undesirably applied to the flexible rubber plate upon welding the components of the orifice member. Moreover, the flexible rubber plate of the partition structure is bonded at its periphery to the surface of the calking portion of the orifice member which defines the inner circumferential portion of the orifice member, making it possible that the flexible rubber plate is bonded with an increased bonded area to the orifice member. It is noted that the orifice member may define partially the orifice passage, such that the first and second component cooperate to define a circumferential groove whose opening is closed by the second mounting member to define therebetween the orifice passage, for example. Alternatively, the orifice member may define completely the orifice passage, such that the first and second components cooperate to define therebetween the orifice passage.

While the peripheral portion of the flexible rubber plate is only required to be bonded to the surface of the calking portion of the one of the pair of annular components in the process of vulcanization of the rubber material to form the flexible rubber plate, it may be possible that the peripheral portion of the flexible rubber plate is bonded to the other part of the one and/or the other annular component, as well as the surface of the calking portion. It is noted that a specific length and a specific cross sectional area of the orifice passage defined by the orifice member are not particularly limited, but may be suitably dimensioned taken into account required vibration damping characteristic of vibration damping devices. For instance, the orifice passage may be formed so as to extend in the circumferential direction of the orifice member with a circumferential length which is slightly smaller than a value corresponding to the entire circumference of the orifice member, or alternatively be formed so as to extend spirally with a length which is longer than a value corresponding to the entire circumference of the orifice member.

(2) A fluid-filled vibration damping device according to the above mode (1), wherein radially outer portions of the first and second annular components extend radially outwardly, while being spaced-apart form each other in the axial direction thereof, so as to define therebetween an annular groove open in an outer circumferential surface of the orifice member, an opening of the annular groove being fluid-tightly closed by the cylindrical portion of the second mounting member to define therebetween the orifice passage.

In the above mode (2), each of the first and second annular components can be clamped at its outer peripheral portion, when the inner peripheral portion of these annular components are subjected to the calking operation. This arrangement facilitates handling and positioning of these components during the calking operation. It is preferably that the inner circumferential surface of the second mounting member is covered by a sealing rubber layer at a portion which is disposed radially outwardly on the opening of the annular groove, so that the opening of the annular groove is closed by the portion of the inner circumferential surface of the second mounting member with the sealing rubber layer sandwiched therebetween, thereby assuring an improved fluid-tight-sealing of the orifice passage.

(3) A fluid-filled vibration damping device according to the above mode (1) or (2), wherein the first annular components whose inner peripheral portion is bent to be calked to the inner peripheral portion of the second annular component has a wall thickness at least at the inner peripheral portion thereof which is made smaller than a wall thickness of the second annular component.

In the above mode (3), the inner peripheral portion of the first annular component can be easily bent owing to its reduced thickness, facilitating a bending operation with respect to the inner peripheral portion of the second annular component. This arrangement is effective to prevent occurrence of undesirable deformation of the second annular component due to an excess force acting thereon during the bending operation with respect to the first annular component, resulting in an improved efficiency of the bending operation and an improved strength of the orifice member resistive to load.

(4) A fluid-filled vibration damping device according to any one of the above modes (1)–(3), wherein the cylindrical portion of the second mounting member has an axially opposite open ends one of which is opposed to the first mounting member and is fluid-tightly closed by the elastic body, while the other open end of the cylindrical portion is fluid-tightly closed by the flexible diaphragm, such that the flexible diaphragm is bonded at its peripheral portion to a cylindrical fixing sleeve and is axially superposed at the cylindrical fixing sleeve on one of axially opposite surfaces of the orifice member of the partition structure, which is remote from the primary fluid chamber, and the cylindrical portion of the second mounting member being drawn onto and forcedly fitted onto outer circumferential surfaces of the orifice member of the partition structure and the cylindrical fixing sleeve.

In the above mode (4), the partition structure and the flexible diaphragm can be easily assembled with respect to the second mounting member by only inserting the partition structure and the flexible diaphragm the predetermined position of the second mounting member in this order from the other opening of the second mounting member. Further, the cylindrical fixing sleeve is forcedly fitted onto the inner circumferential surface of the second mounting member, thereby assuring an excellent fluid tight-sealing in the other open end of the second mounting member.

(5) A fluid-filled vibration damping device according to any one of the above modes (1)–(4), wherein the one of the first and second annular components has an engaging protrusion formed by pressing operation, while the other annular component has an engaging recess formed by pressing operation, the engaging protrusion and recess being engaged with each other so that the first and second annular components are positioned relative to each other in the circumferential direction thereof.

In the above mode (5), the provision of the engaging protrusion. and recess permits a stable positioning of the first and second annular components relative to each other, upon assembling the annular components together, even in the case where the pair of the annular components have specific positions for assembling thereof. These engaging protrusion and recess can be formed integrally with the respective annular components by pressing. That is, each of the annular components and the corresponding engaging protrusion or recess can be simultaneously formed by a single pressing operation.

(6) A fluid-filled vibration damping device according to any one of the above modes (1)–(5), wherein the first and second annular components are axially spaced-apart from each other at the radially outer portions thereof to define therebetween the orifice passage extending in the circumferential direction thereof, the first and second annular components being held in close contact with each other at respective circumferential positions in the radially outer portions thereof so as to form a blocking portion, in the radially outer portions thereof so as to form a blocking portion, so that the orifice passage is made discontinuous by the blocking portion in the circumferential direction thereof and extends in the circumferential direction with a circumferential length which is slightly smaller than a value corresponding to an entire circumference of the orifice member, the one of the first and second annular components further including a first communication hole formed therethrough, which is located on one of circumferential opposite sides of the blocking portion for fluid communication between one of opposite ends of the orifice passage and the primary fluid chamber, while the other annular component further includes a second communication hole formed therethrough, which is located on the other sides of the blocking position for fluid communication between the other end of the orifice passage and the auxiliary fluid chamber, the engaging protrusion being formed at the circumferential position of one of the first and second annular components, while the engaging recess being formed at the circumferential position of the other annular component. being axially spaced-apart from each other at the radially outer portions thereof to define therebetween the orifice passage extending in the circumferential direction thereof, the first and second annular components being held in close contact with each other at respective circumferential positions in the radially outer portions thereof so as to form a blocking portion, in the radially outer portions thereof so as to form a blocking portion, so that the orifice passage is made discontinuous by the blocking portion in the circumferential direction thereof and extends in the circumferential direction with a circumferential length which is slightly smaller than a value corresponding to an entire circumference of the orifice member, the one of the first and second annular components further including a first communication hole formed therethrough, which is located on one of circumferential opposite sides of the blocking portion for fluid communication between one of opposite ends of the orifice passage and the primary fluid chamber, while the other annular component further includes a second communication hole formed therethrough, which is located on the other sides of the blocking position for fluid communication between the other end of the orifice passage and the auxiliary fluid chamber, the engaging protrusion being formed at the circumferential position of one of the first and second annular components, while the engaging recess being formed at the circumferential position of the other annular component.

In the above mode (6), the pair of components cooperate to each other to define the orifice passage therebetween which extends in the circumferential direction with the circumferential length which is slightly smaller than the value corresponding to the entire of the circumference of the orifice member, without needing other members. In particular, the first and second components are desirably positioned relative to each other by means of the engaging protrusion and recess. Accordingly, the first and second communication hole can be suitably located at predetermined positions, respectively, resulting in a stable formation of the desired orifice passage.

BRIEF DESCRIPTION OF THE DRAWINGS

The above and optional objects, features advantages and technical and industrial significance of the present invention will be better understood by reading the following detailed description of the present preferred embodiments or modes of the invention when considered in connection with the accompanying drawings in which.

DETAILED DESCRIPTION OF THE PREFERRED EMBODIMENTS

Figures 1, 2:
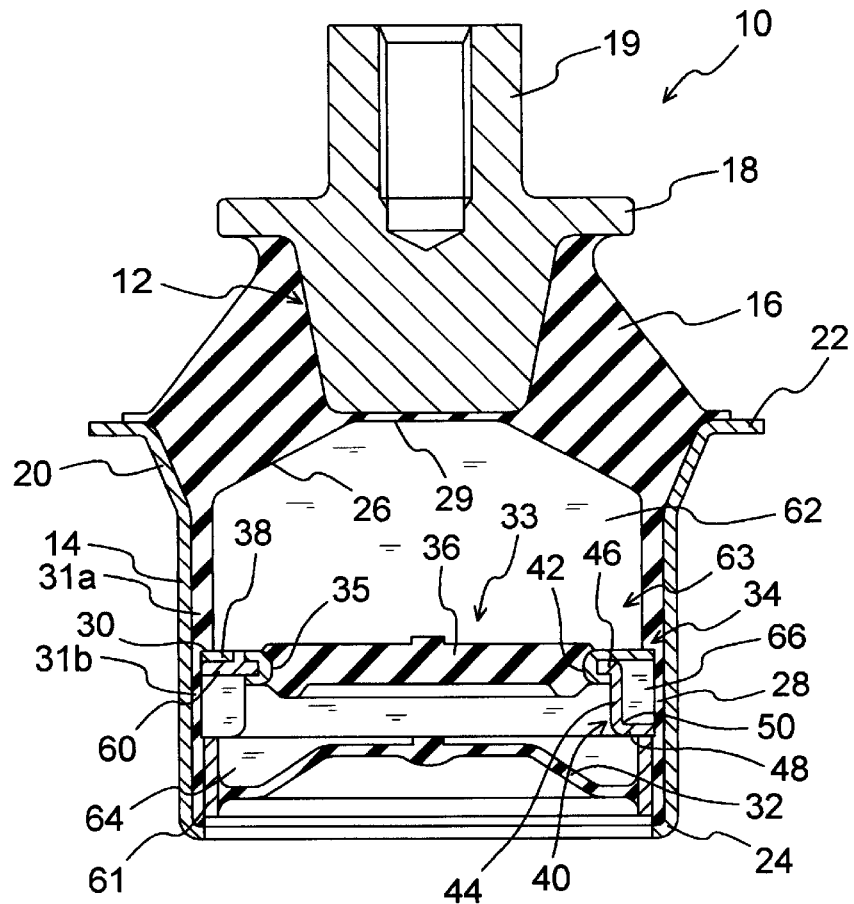
FIG. 1 is an elevational view in axial cross section of a fluid-filled vibration damping device in the form of an automotive vehicle engine mount constructed according to one embodiment of this invention.
FIG. 2 is a plan view of an orifice member provided in the engine mount of FIG. 1.

Referring first to FIG. 1, an engine mount 10 for an automotive vehicle is shown as one embodiment of the fluid-filled vibration damping device of the present invention. This engine mount 10 includes a first mounting member 12 and a second mounting member 14 which are spaced apart from each other in their axial direction and are elastically connected to each other by an elastic body 16 interposed therebetween. The first mounting member 12 is attached to the power unit of the vehicle (not shown), while the second mounting member 14 is attached to the body of the vehicle (not shown), so that the power unit is supported by the vehicle body in a vibration damping fashion. With the engine mount 10 thus installed on the vehicle, a load or weight of the power unit is acts on the engine mount 10 in the vertical direction as seen in FIG. 1, that in the axial direction of the engine mount 10 in which the first and second mounting member 12, 14 are opposed to each other. The engine mount 10 receives a vibrational load primarily in the vertical direction.

Described in detail, the first mounting member 12 is made of a rigid material such as metal and has a generally inverted frustoconical shape. The first mounting member 12 includes an annular stopper portion 18 formed integrally at its large-diameter end portion. The stopper portion 18 protrudes radially outwardly of the large-diameter end portion of the first mounting member 12 by a suitable radial distance. The first mounting member 12 further includes a rod portion 19 which extends axially upwardly (outwardly) from a radially central portion of the large-diameter end face of the first mounting member 12 as seen in FIG. 1. The rod portion 19 has a threaded hole extending from its upper end face toward the large-diameter end portion of the first mounting member 12. The first mounting member 12 is fixed to the power unit by a bolt (not shown) screwed in the threaded hole.

The second mounting member 14 is a generally cylindrical member having a relatively large diameter, and is made of a rigid material such as metal. The second mounting member 14 is disposed below the first mounting member 12 as seen in FIG. 1 with a given axial spacing therebetween, while being held in substantially coaxial relationship with the first mounting member 12. The second mounting member 14 includes a tapering portion 20 formed at one of axially opposed end portions located adjacent to the first mounting member 12, i.e., an axially upper open end portion as seen in FIG. 1. The tapering portion 20 extends axially upwardly (outwardly) and radially outwardly toward the upper end portion of the second mounting member 14. The second mounting member 14 further includes an annular outward flange 22 formed integrally at an open end portion of the tapering portion 20 such that the outward flange 22 protrudes radially outwardly from the open end portion of the tapering portion 20 by a given radial distance. The second mounting member 14 has an integrally formed annular inwardly bent edge 24 at the other axial end portion (i.e., a lower open end as seen in FIG. 1) which protrudes radially inwardly by a slight radial distance. The second mounting member 14 is press-fitted in a suitable cylindrical mounting bracket (not shown) made of a rigid material, and is attached to the vehicle body through the mounting bracket.

The elastic body 16 interposed between the first and second mounting members 12, 14 is a generally frustoconical member whose circumferential surface is a tapered cylindrical shape with a diameter gradually decreased toward its small diameter portion i.e., its axially upper end, and has a cavity 29 open in its large-diameter end face. The first mounting member 12 is bonded to the small-diameter portion of the elastic body 16 in the process of vulcanization of a rubber material of the elastic body 16, such that the first mounting member 12 is partially embedded in the small-diameter portion of the elastic body 16 so as to extend in an axially downward direction, and a lower end surface of the annular stopper portion 18 is superposed on and bonded to the small-diameter end face of the elastic body 16. The second mounting member 14 is bonded at an inner circumferential surface of its tapering portion 20 to the outer circumferential surface of the large-diameter end portion of the elastic body 16, in the above-indicated vulcanization process. Thus, the first mounting member 12, second mounting member 14 and elastic body 16 are formed into an integral intermediate product by means of the vulcanization, wherein the elastic body 16 is bonded at its small-diameter end portion to the circumferential surface of the first mounting member 12 and at its large-diameter end portion to the inner circumferential surface of the second mounting member 14.

In the thus constructed integral intermediate product, the axially upper open end of the second mounting member 14 is fluid-tightly closed by the elastic large-diameter end portion of the elastic body 16, so that there is formed an interior space 26 of the second mounting member 14 open in the axially lower open end of the second mounting member 14. The second mounting member 14 has a thin sealing rubber layer 28 which is formed on and bonded to its inner circumferential surface over the generally entire area of the surface, in the process of vulcanization of a rubber material for forming the sealing rubber layer 28. The sealing rubber layer 28 is formed integrally with the elastic body 16. Meanwhile, the cavity 29 serves to reduce or eliminate a tensile stress which is applied to the elastic body 16 due to the weight of the power unit when the engine mount is installed on the vehicle as described above, leading to a sufficient durability of the elastic body 16.

The sealing rubber layer 28 includes a shoulder portion 30 formed in its axially intermediate portion, an upper thick-walled portion 31a located on one of opposite sides of the shoulder portion 30, and a lower thin-walled portion 31b located on the other sides of the shoulder portion 30. The present engine mount 10 further includes a partition structure 33 and a flexible diaphragm 32 (which will be described later), which are inserted from the lower open end of the second mounting member 14 in this order, and which are disposed radially inwardly of respective axial portions of the lower thin-walled portion 31b of the sealing rubber layer 28, such that circumferential portions of the partition structure 33 and the diaphragm 32 are forcedly fitted onto the respective portions of the inner circumferential surface of the second mounting member 14 with the thin-walled portion 31b compressed therebetween. The partition structure 33 is held in abutting contact at an outer peripheral portion of its upper end face with the shoulder portion 33 of the sealing rubber layer 28, so that the partition structure 30 is suitably positioned relative to the second mounting member 14 in their axial direction.

Figure 3:
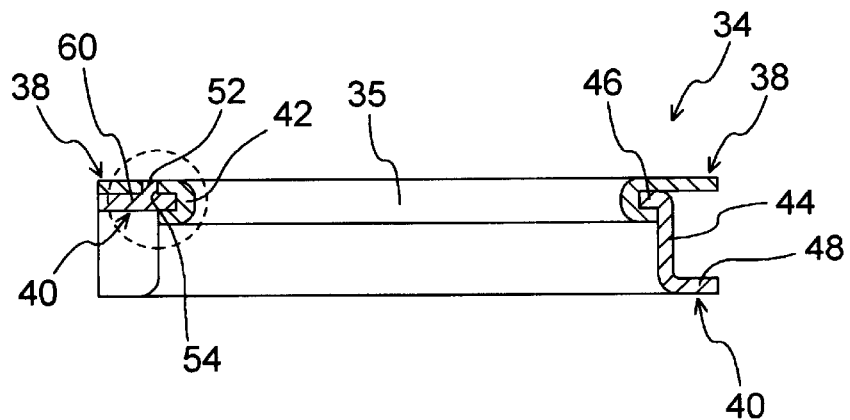
FIG. 3 is a cross sectional view being taken along line 3—3 of FIG. 2.
Figure 4:
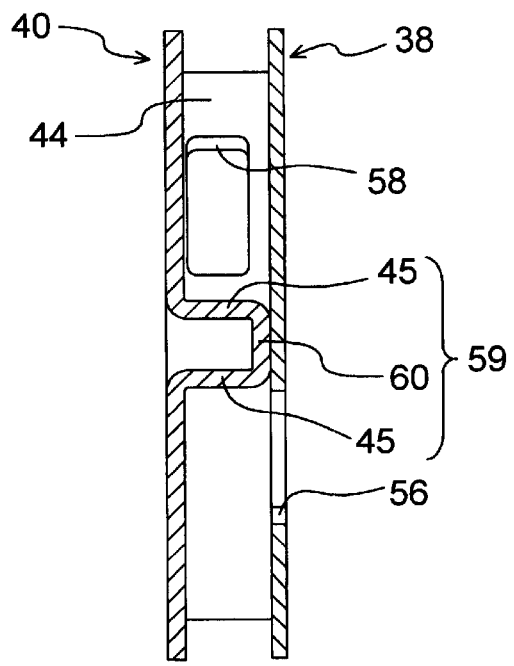
FIG. 4 is a left-side elevational view of the orifice member of FIG. 2.

The partition structure 33 includes an orifice member 34 being a generally annular member and having a central hole 35 formed through its thickness, and a flexible rubber plate 36 disposed in the central hole 35 so as to fluid-tightly close the central hole 35. As is apparent from FIGS. 2–4, the orifice member 34 consists of an upper component 38 and a lower component 40 which are made of a metallic material by pressing and which are superposed on each other in their axial direction. The upper component 38 has a generally annular shape and includes a calking portion 42 integrally formed at its inner peripheral portion by bending the inner peripheral portion of the upper component 38 in the axially downward direction. The lower component 40 includes a generally cylindrical sidewall portion 44 as a cylindrical wall portion, which extends in its axial direction with a suitable axial length, while extending in the circumferential direction such that circumferentially opposite end faces of the side-wall portion 44 are opposed to each other in the circumferential direction with a slight circumferential distance therebetween. The lower components 40 have an annular connecting portion 46 as an annular inwardly bent edge, which is formed integrally at an axially upper end portion of the side-wall portion 44. On the other hand, an axially lower end portion of the sidewall portion 44 is bent in its radially outward direction so as to provide an integrally formed bottom-wall portion 48 in the form of an annular outwardly bent edge.

The lower component 40 further includes a protruding plate portion 60 formed integrally at a circumferential portion of the annular connecting portion 46 so as to protrude radially outwardly from the circumference of the connecting portion 46 to the outer circumference of the orifice member 34. In addition, a pair of partition walls 45, 45 are formed integrally at the circumferentially opposite end faces of the side-wall portion 44, respectively, each extending in the generally radial direction from the corresponding end face of the side-wall portion 44 to the outer circumferential surface of the orifice member 34. Each partition wall 45 is integrally connected at its axially upper end face with the corresponding one of the circumferentially opposite side faces of the protruding plate portion 60 and at its axially lower end face with the corresponding one of the circumferentially opposite end faces of the bottom wall portion 48. Therefore, the side-wall portion 44 and the bottom-wall portion 48 of the orifice member 34 are made discontinuous in the circumferential direction of the orifice member 34, by a blocking portion 59 constituted by a combination of the partition walls 45, 45 and the protruding plate portion 60. These upper and lower components 38, 40 of the orifice member 34 can be made by suitably pressing a metallic plate such as a steel plate.

The thus formed upper and lower components 38, 40 of the orifice member 34 are superposed on each other in their axial direction and fixedly secured to each other by calking the calking portion 42 of the upper component 38 to the inner circumferential surface of the lower component 40. In the present embodiment, the upper and lower components 38, 40 cooperate to constitute the orifice member 34 and cooperate to define therebetween a circumferential groove 50 which is open in the outer circumferential surface of the orifice member 34. Further, the upper component 38 is formed with a cutout 56 as a first communication hole, while the lower component 40 is formed with a communication hole 58 as a second communication hole formed through its side-wall portion 44. With the partition structure 33 accommodated with respect to the second mounting member 14, the circumferential groove 50 is open through the cutout 56 to the interior space partially defined by the elastic body 16 on the axially upper side of the partition structure 33, while being open through the communication hole 58 to the interior space partially defined by the flexible diaphragm 32 on the axially lower side of the partition structure 33.

In the orifice member 34, the protruding plate portion 60 of the lower component 40 is held in close contact with the lower end surface of the upper component 38 over its entire area. In this arrangement, the circumferential groove 50 is interrupted in the circumferential direction by the blocking portion 59 constituted by the partition wall portions 45, 45 and the protruding plate portion 60 of the lower component 40. Thus, the circumferential groove 50 extends in the circumferential direction of the orifice member 34 with a circumferential length which is slightly smaller than a value corresponding to the entire circumference of the orifice member 34, while having a generally constant rectangular-groove shape in cross section.

Figure 5:
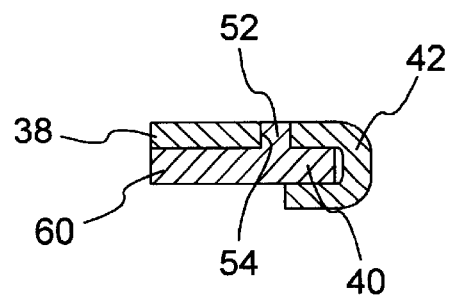
FIG. 5 is an enlarged view showing a blocking part of the orifice member of FIG. 2.

Referring next to FIG. 5, the protruding plate portion 60 of the lower component 40 has a positioning protrusion 52 as an engaging protrusion is formed integrally at its suitable circumferential portion by pressing. The upper component 38 also has a positioning hole 54 as an engaging recess which is formed at its corresponding circumferential portion by punching. When the upper and lower components 38, 40 are superposed on each other, the positioning protrusion 52 of the lower component 40 is fitted into the positioning hole 54 of the upper component 38, so that the upper and lower components 38, 40 are positioned relative to each other in the circumferential direction. With the upper and lower components 38, 40 being positioned relative to each other as described above, the cutout 56 of the upper component 38 and the communication hole 58 of the lower component 40 are located adjacent to the respective circumferential opposite sides of the protruding plate portion 60. In other words, the cutout 56 and the communication hole 58 are located in the circumferentially opposite end portions of the circumferential groove 50, respectively.

In the thus constructed upper and lower components 38, 40, the calking portion 42 of the upper component 38 is calked to the connecting portion 46 of the lower component 40 according to the following manner, for example. First, the upper component 38 is clamped by a suitably clamping device at its outer circumferential portion, while the lower component 40 is also clamped by a suitable clamping device at an outer circumferential portion of its bottom-wall portion 48. Successively, the inner circumferential portion of the upper component 38 is superposed on the connecting portion 46 of the lower components 40, while the positioning protrusion 52 and the positioning hole 54 are engaged to each other. Then, the calking portion 42 of the upper component 38 is calked to the connecting portion 46 of the lower component 40. In the present embodiment, particularly, the thickness of the upper component 38 is made smaller than that of the lower component 40. This arrangement facilitates the above-described calking operation, while effectively presenting occurrence of unnecessary deformation of the lower component 40 due to the load acting on the lower component 40 during the calking operation.

In the orifice member 34 constructed according to the present embodiment, the calking portion 42 of the upper component 38 is located in the inner circumferential portion of the orifice member 34 such that an outer circumferential surface of the calking portion 42 defines the central hole 35 of the orifice member 34. On the other hand, the flexible rubber plate 36 has a generally circular disc shape with a constant thickness, and is disposed in the central hole 35 so as to extend in a direction perpendicular to the axial direction of the orifice member 34. The flexible rubber plate 36 is bonded at its peripheral portion to over the entire area of the calking portion 42 of the upper components 38 in the process of vulcanization of a rubber material to form the flexible rubber plate 36. The vulcanization process for forming the flexible rubber plate 36 may be performed by using a suitable mold for molding the flexible rubber plate 36 wherein the orifice member 34 consisting of the upper and lower component 38, 40 mutually fixedly fitted by calking, is set in a predetermined position of the mold. Thus, there is obtained the partition structure 33 as an integral vulcanized product including the orifice member 34.

In the thus obtained integral vulcanized product in the form of the partition structure 33, the calking portion 42 serves as the inner circumferential surface of the orifice member 34 to which the outer peripheral portion of the flexible rubber plate 36 is bonded. It is noted that the calking portion 42 is bent so as to have a smooth round or convex outer surface, and extends over the entire inner circumference of the orifice member 34. This arrangement advantageously increases an area of the inner circumferential surface of the orifice member 34, so that the flexible rubber plate 36 can be bonded to the inner circumferential surface of the orifice member 34 with an increased bonding surface area. In addition, the outer surface of the calking portion 42 is rounded smoothly, thereby effectively eliminating or avoiding a stress concentration to a local portion in a bonding portion of the flexible rubber plate 36 with respect to the calking portion 42, resulting in an excellent durability of the flexible rubber plate 36 at its bonding portion with respect to the orifice member 34.

The above-mentioned flexible diaphragm 32 is a relatively thin-walled flexible rubber layer and is bonded at its peripheral portion to the inner circumferential surface of a cylindrical metallic sleeve 61 in the process of vulcanization of a rubber material to form the flexible diaphragm 32. The orifice member 34 and the flexible diaphragm 32 are assembled with respect to the respective axial position of the second mounting member 14, such that the cylindrical metallic sleeve 61 of the flexible diaphragm 32 is held in close contact at its axially upper end face with the axially lower end face of the orifice member 34 in their axial direction. In this condition, the second mounting member 14 is drawn onto the outer circumferential surfaces of the partition structure 33 and the metallic sleeve 61, whereby the partition structure 33 and the metallic sleeve 61 are fixedly secured to and supported by the second mounting member 14. The above-described sealing rubber layer 28 is sandwiched by and between the outer circumferential surfaces of the partition structure 33 and the metallic sleeve 61 and the inner circumferential surface of the second mounting member 14, so as to assure fluid-tight sealing therebetween.

With the partition structure 33 and the flexible diaphragm 32 assembled in the second mounting member 14 as described above, the lower open end of the second mounting member 14 is fluid-tightly closed by the flexible diaphragm 32. Thus, the second mounting member 14, elastic body 16, and flexible diaphragm 32 cooperate with each other to define a fluid-tightly enclosed fluid chamber 63 filled with a non-compressible fluid. The non-compressible fluid filling the fluid chamber 63 may be desirably selected from among water, alkylene glycol, polyalkylene glycol, silicone oil and a mixture thereof. For the engine mount 10 to exhibit a sufficiently high vibration damping effect based on resonance or flows of the non-compressible fluid through the fluid chamber 63, it is desirable to use a non-compressible fluid whose viscosity is not higher than 0.1 Pa·s. The filling of the non-compressible fluid to the fluid chamber 63 is advantageously conducted such that the partition structure 33 and the flexible diaphragm 32 are assembled with respect to the second mounting member 14 of the integral intermediate product consisting of the first and second mounting members 12, 14 and elastic body 16, in the mass of the selected non-compressible fluid.

The fluid chamber 63 is fluid-tightly separated by the partition structure 33 into two sections, namely, a primary fluid chamber in the form of a pressure receiving chamber 62 located on the upper side of the partition structure 33, and an auxiliary fluid chamber in the form of an equilibrium fluid chamber 64 located on the lower side of the partition structure 33. The pressure receiving chamber 62 is partially defined by the elastic body 16, while the equilibrium fluid chamber 64 is partially defined by the flexible diaphragm 32. Upon application of a vibrational load to the engine mount, the pressure in the pressure receiving chamber 62 changes due to elastic deformation of the elastic body 16, while the flexible diaphragm 32 is elastically deformed or displaced so as to permit a change in the volume of the equilibrium fluid chamber 64.

With the partition structure 33 thus assembled with respect to the second mounting member 14, the opening of the circumferential groove 50 of the orifice member 34 is fluid tightly closed by the inner circumferential surface of the second mounting member 14, whereby an orifice passage 66 is formed so as to circumferentially extend along the inner circumferential surface of the second mounting member 14 with a circumferential length which is slightly smaller than a value corresponding to the entire circumference of the partition structure 33. The orifice passage 66 communicates at its one end with the pressure receiving chamber 62 through the cutout 56 formed through the upper component 38 of the orifice member 34, and at the other end with the equilibrium fluid chamber 64 through the communication hole 58 formed through the lower component 40 of the orifice member 34. Thus, the orifice passage 66 serves for fluid communication between the pressure receiving chamber 62 and the equilibrium fluid chamber 64. Upon application of a vibrational load to the engine mount 10, the pressure of the fluid in the pressure receiving chamber 62 is changed due to the elastic deformation of the elastic body 16, generating a difference of pressure of the fluid between the pressure receiving chamber 62 and the equilibrium fluid chamber 64. Based on this fluid pressure difference, the fluid is forced to flow between the pressure receiving chamber 62 and the equilibrium fluid chamber 64 through the orifice passage 66. Based on the resonance or flow of the fluid, the engine mount 10 exhibits a desired vibration damping effect. In the present embodiment, the orifice passage 66 is suitably dimensioned or tuned in terms of its cross sectional area and its length so that the engine mount 10 exhibits an excellent vibration damping effect with respect to low frequency vibrations such as engine shake, owing to the resonance or flow of the fluid flowing through the orifice passage 66.

The flexible rubber plate 36 closing the central hole 35 of the orifice member 34 is subjected at its axially upper surface to the fluid pressure in the pressure receiving chamber 62 and at its axially lower surface to the fluid pressure in the equilibrium fluid chamber 64. That is, the flexible rubber plate 36 is elastically deformed based on the difference in the fluid pressure between the pressure receiving chamber 62 and the equilibrium fluid chamber 64. The elastic deformation of the flexible rubber plate 36 permits substantial flows of the fluid between the pressure receiving chamber 62 and the equilibrium fluid chamber 64, causing resonance of the fluid or absorption of the pressure change in the pressure receiving chamber 62, whereby the engine mount 10 exhibits a reduced dynamic spring constant with respect to input vibrations having a predetermined frequency band. In the present embodiment, the flexible rubber plate 36 is suitably dimensioned in terms of its spring characteristics and its size so that the engine mount 10 exhibits an excellent vibration damping effect with respect to the medium and high frequency vibrations such as engine idling vibration or booming noise, based on the resonance of the fluid or absorption of the pressure change in the pressure receiving chamber 62 owing to the elastic deformation of the flexible rubber plate 36. It is noted that an amount of the elastic deformation of the flexible rubber plate 36 is limited by its own elasticity, so that the elastic deformation of the flexible rubber plate 36 is effectively restricted, upon application of low-frequency and large amplitude vibrations to the engine mount 10, thereby assuring a sufficient amount of flows of the fluid flowing through the orifice passage 66.

In the engine mount 10 constructed according to the present embodiment, the orifice member 34 of the partition structure 33 is formed of a mutually axially fitted upper and lower components 38, 40. This arrangement facilitates formation of the orifice member 34, in comparison with conventionally used orifice members which are formed by cutting or die-casting, so that the engine mount 10 can be easily manufactured with a reduced manufacturing cost.

While the upper and lower components 38, 40 of the orifice member 34 are mutually fixed at the calking portion 42, the calking portion 42 is effectively utilized for providing the sufficiently large inner circumferential surface of the orifice member 34 to which the peripheral portion of the flexible rubber plate 36 is bonded. This arrangement is effective to obtain a sufficiently large bonding surface area of the flexible rubber plate 36 with respect to the inner circumferential surface of the orifice member 34, assuring a high durability of and a sufficiently high degree of reliability of the flexible rubber plate 36 and the engine mount 10.

The upper and lower components 38, 40 are mutually fixed by calking to form the orifice member 34. This arrangement assures a sufficiently high degree of reliability of strength of the orifice member 34, in comparison with the conventional orifice member whose components are press-fitted to each other. In addition, this arrangement minimize or is free from a problem of adverse influence of heat on the flexible rubber plate 36 and a resultant deterioration of the elastic characteristics of the flexible rubber plate 36, in comparison with the conventional orifice member whose components are fusion-welded together.

While the presently preferred embodiment of this invention has been described in detail for illustrative purpose only, it is to be understood that the present invention is not limited to the details of the illustrated embodiments, but may be embodied with various changes modifications and improvements.

In the illustrated embodiment, the orifice member 34 (the upper and lower components 38, 40) includes the blocking portion which defines the circumferential opposite ends of the orifice passage 66. The configuration of an orifice passage of the present invention is not limited to the illustrated one. For instance, the orifice passage may be formed without the blocking portion 59, so as to be provided as an annular orifice passage. In this case, the cutout 56 of the upper component 38 and the communication hole 58 of the second component 40 may be relatively positioned so as to be opposed to each other in a diametric direction of the orifice member 34, thereby forming a pair of orifice passage each having a circumferential length which is generally equal to a value corresponding a half of a circumference of the orifice member 34.

Figure 6:
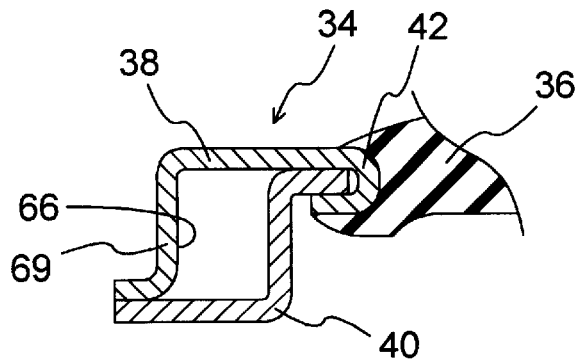
FIG. 6 is a fragmentally enlarged view in cross section showing one modification of the orifice member provided in the engine mount of FIG. 1.

While the partition structure 33 and the flexible diaphragm 32 are both inserted into and fitted onto the bore of the cylindrical second mounting member 14 in the order of the description, in the illustrated embodiment, these partition structure 33 and flexible diaphragm 32 may be otherwise assembled with respect to the second mounting member 14. For instance, the configuration of the orifice member 34 is modified as illustrated in FIG. 6, so that the partition structure 33 and the flexible diaphragm 32 is otherwise assembled with respect to the second mounting member 14. Described in detail, the upper component 38 of the orifice member 34 extends radially outwardly by a given radial distance. The radially outer portion of the upper component 38 is bend axially downward direction to form a side-wall portion 69 as a cylindrical wall portion. The axially lower end portion of the side-wall portion 69 is bent in the radially outward direction so as to be placed on the outer peripheral portion of the bottom-wall portion of the lower component 40. The thus constructed upper and lower components 38, 40 are superposed on each other in their axial direction, to thereby define therebetween a closed orifice passage 66 extending in the circumferential direction of the orifice member 34. The orifice member 34 of FIG. 6 can be assembled by calking with respect to the second mounting member 14, such that the outer peripheral portions of the upper and lower components 38, 40, which are superposed on each other in their axial direction, are calked by the calking portion 42 formed at an axially intermediate portion of the second mounting member 14. In this case, the flexible diaphragm 32 may not be bonded to the circumferential metallic sleeve 61, and may be calked at its peripheral portion by the calking portion of the second mounting member 14, together with the outer peripheral portions of the upper and lower components 38, 40. JP-A-4-262142 discloses one example of such a calking structure.

Figure 7:
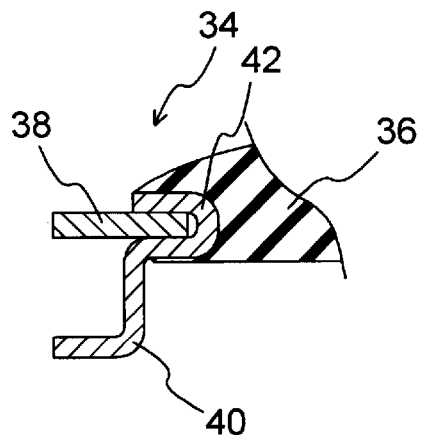
FIG. 7 is a fragmentally enlarged view in cross section showing another modification of the orifice member provided in the engine mount of FIG. 1.
Figure 8:
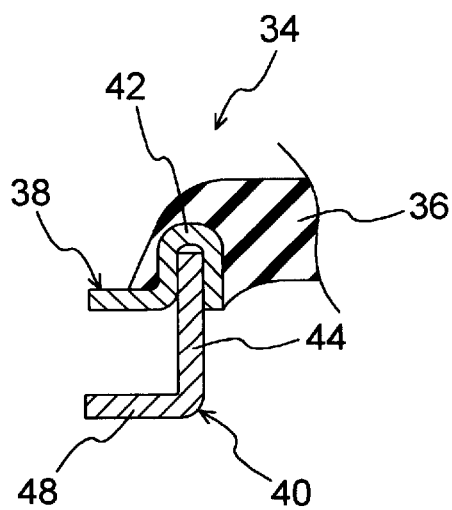
FIG. 8 is a fragmentally enlarged view in cross section showing a further modification of the orifice member provided in the engine mount of FIG. 1.
Figure 9:
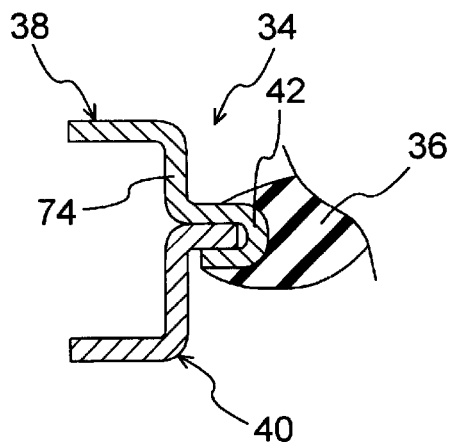
FIG. 9 is a fragmentally enlarged view in cross section showing a still further modification of the orifice member provided in the engine mount of FIG. 2.

The structure of calking the upper and lower component 38, 40 together are not limited to the illustrated embodiment. Referring next to FIGS. 7–9, there are shown presently preferred modifications of the calking structures of the upper and lower component 38, 40. In the following modifications, the reference numerals used in the preceding embodiment will be used to identify the corresponding elements, and no description of these elements will be provided.

In the modification of FIG. 7, the upper component 38 is an annular disk shaped member, while the lower component 40 has a calking portion 42 at an axially upper end portion of its side wall portion 44. The calking portion 42 of the lower component 40 is calked to the inner peripheral portion of the upper component 38.

In the modification of FIG. 8, the upper component 38 has the calking portion 42 at its inner circumferential portion, and is calked to the axially upper end portion of the side-wall portion 44 of the lower component 40.

In the modification of FIG. 9, the upper component 38 further includes a side-wall portion 74 as a cylindrical wall portion, at its inner circumferential portion, which extends axially downward directions, so that the upper component 38 has an inverted "L" shape. In this arrangement, the calking portion 42 is located axially intermediate portion of the orifice member 34.

It should be understood that an engine mount which incorporates any one of the above-described modifications of the calking structure as shown in FIGS. 7–9 is capable of exhibiting effects of the present invention as in the engine mount 10 of the illustrated embodiment, and these modifications of the calking structure do not deviate from the scope of the invention.

Figure 10:
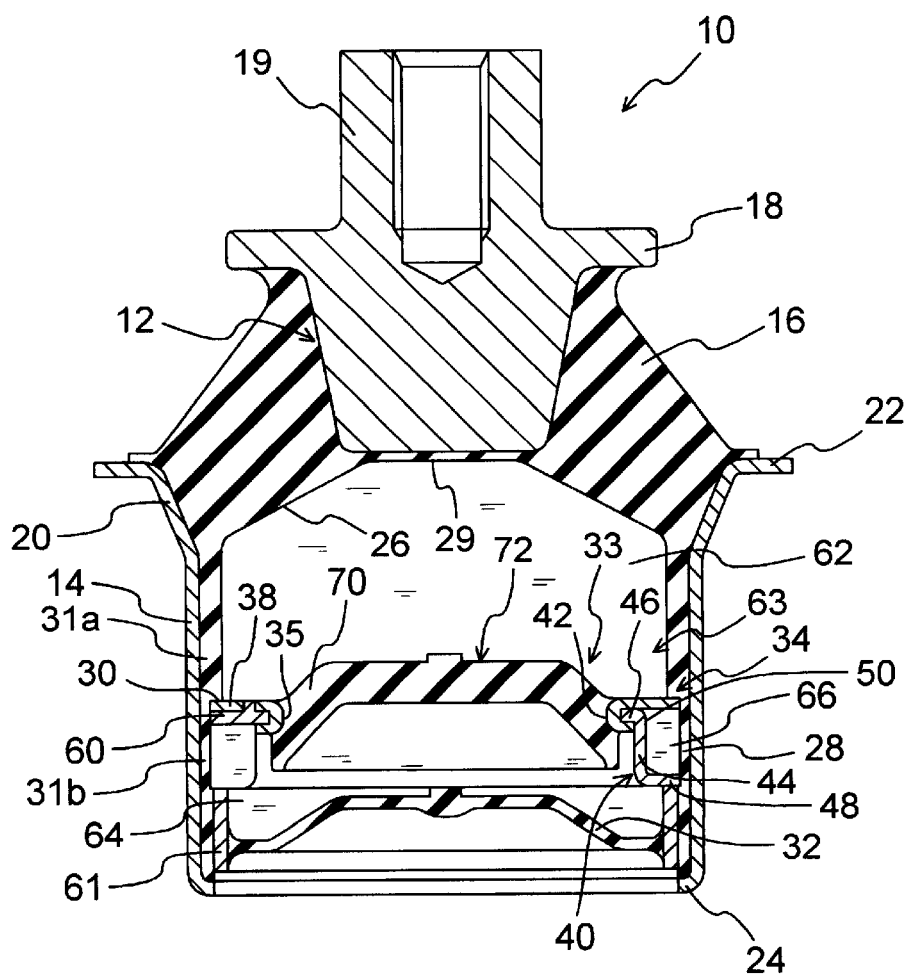
FIG. 10 is a fragmentally enlarged view in cross section showing a yet further modification of the orifice member provided in the engine mount of FIG. 1.

The specific configuration or structure of the flexible rubber plate 36 is not limited to the illustrated embodiment, but may be suitably changed in the light of required vibration characteristics of a vibration damping device. As is apparent from FIG. 10, it may be possible to employ a flexible rubber plate 72 which includes a tapered radially outer portion 70, for example. In this arrangement, the rubber plate 72 effectively exhibits the compression component of its elasticity with respect to the fluid pressure of the pressure receiving chamber acting thereon, resulting in an improved vibration damping effect with respect to low-frequency vibrations. In FIG. 10, the reference numerals used in the illustrated embodiment are also used to identify the corresponding elements.

While the presently preferred embodiments of the fluid-filled vibration damping device of the present invention in the form of the engine mount for automotive vehicles have been described above, the principle of this invention is equally applicable to other types of fluid-filled vibration damping devices, such as body mounts and differential mounts, for automotive vehicles, and fluid-filled dampers for various machines and other equipment other than automotive vehicles.

It is to be understood that the present invention may be embodied with various other changes, modifications and improvements which may occur to those skilled in the art, without departing from the spirit and scope of the invention defined in the following claims.

What is claimed is:

1. A fluid-filled vibration damping device comprising:

a first mounting member and a second mounting member which are spaced-apart from each other, said second mounting member having a cylindrical portion open to said first mounting member;

an elastic body elastically connecting said first and second mounting members and partially defining a primary fluid chamber filled with a non-compressible fluid;

a partition structure which includes an annular orifice member having a central hole and being fixedly supported by said second mounting member, while defining an orifice passage extending along an inner circumferential surface of said cylindrical portion of said second mounting member in a circumferential direction thereof, and a flexible rubber plate fluid-tightly closing said central hole of said orifice member, said partition structure partially defines said primary fluid chamber on one of opposite sides thereof; and a flexible diaphragm partially defining an auxiliary fluid chamber which is filled with the non-compressible fluid, held in fluid communication with said primary fluid chamber through said orifice passage, and located on the other side of said partition structure which is remote from said primary fluid chamber, said orifice member including a first and a second annular components which are made of a metallic material by pressing and are superposed on each other in an axial direction thereof so as to define therebetween said orifice passage, said first and second annular components being fixed together such that an inner peripheral portion of said first annular component is bent to form a calking portion which is calked to an inner peripheral portion of said second annular member over a substantially entire inner circumference of said orifice member, said flexible rubber plate being bonded at an peripheral portion thereof to a surface of said calking portion in a process of vulcanization of a rubber material to form said flexible rubber plate.

2. A fluid-filled vibration damping device according to claim 1, wherein said calking portion having a round outer surface, and said flexible rubber plate is bonded at said peripheral portion thereof over an entire of said round outer surface of said calking portion.

3. A fluid-filled vibration damping device according to claim 1, wherein radially outer portions of said first and second annular components extend radially outwardly, while being spaced-apart form each other in said axial direction thereof, so as to define therebetween an annular groove open in an outer circumferential surface of said orifice member, an opening of said annular groove being fluid-tightly closed by said cylindrical portion of said second mounting member to define therebetween said orifice passage.

4. A fluid-filled vibration damping device according to claim 1, wherein radially outer portions of said first and second annular components extend radially outwardly, while being spaced-apart from each other in said axial direction thereof, said radially outer portion of said first annular component being bent so as to extend in said axial direction toward said second annular component and so as to be superposed at an extended end portion thereof on said radially outer portion of said second annular component, to thereby define therebetween said orifice passage.

5. A fluid-filled vibration damping device according to claim 1, wherein said first annular component whose inner peripheral portion is bent to be calked to said inner peripheral portion of said second annular component, has a wall thickness at least at said inner peripheral portion thereof which is made smaller than a wall thickness of said the second annular component.

6. A fluid-filled vibration damping device according to claim 1, wherein radially inner portions of said first and second annular components are superposed on each other in said axial direction over an entire of said inner circumference of said orifice member, and said inner peripheral portion of said first annular component is calked to said inner peripheral portion of said second annular component.

7. A fluid-filled vibration damping device according to claim 6, wherein at least one of said first and second annular components includes a cylindrical wall portion extending in said axial direction, an annular inwardly bent edge integrally formed at one of axially opposite open ends of said cylindrical wall portion, and an annular outwardly bent edge integrally formed at the other open end of said cylindrical wall portion, said annular inwardly bent edge being superposed on said radially inner portion of an other one of at least one of said first and second annular components in said axial direction.

8. A fluid-filled vibration damping device according to claim 1, wherein radially inner portions of said first and second annular components are superposed on each other in a radial direction over an entire of said inner circumference of said orifice member, and said inner peripheral portion of said first annular component is calked to said inner peripheral portion of said second annular component.

9. A fluid-filled vibration damping device according to claim 8, wherein at least one of said first and second annular components includes a cylindrical wall portion extending in said axial direction and an annular outwardly bent edge integrally formed at one of axially opposite open end of said cylindrical wall portion, the other open end of said cylindrical wall portion being superposed on said radially inner portion of the other annular component in said radial direction.

10. A fluid-filled vibration damping device according to claim 1, wherein said flexible rubber plate includes a tapered radially outer portion which extends radially outwardly and axially outwardly in a direction away from said primary fluid chamber.

11. A fluid-filled vibration damping device according to claim 1, wherein said cylindrical portion of said second mounting member has an axially opposite open ends one of which is opposed to said first mounting member and is fluid-tightly closed by said elastic body, while the other open end of said cylindrical portion is fluid-tightly closed by said flexible diaphragm, such that said flexible diaphragm is bonded at its peripheral portion to a cylindrical fixing sleeve and is axially superposed at said cylindrical fixing sleeve on one of axially opposite surfaces of said orifice member of said partition structure, which is remote from said primary fluid chamber, and said cylindrical portion of said second mounting member being drawn onto and forcedly fitted onto outer circumferential surfaces of said orifice member of said partition structure and said cylindrical fixing sleeve.

12. A fluid-filled vibration damping device according to claim 11, wherein an inner circumferential surface of said cylindrical portion of said second mounting member is covered by a sealing rubber layer, said sealing rubber layer having a shoulder formed at an axially intermediate portion thereof, and includes a thick-walled portion on one side of said shoulder and a thin-walled portion on the other side of said shoulder, said thin-walled portion being fitted on said outer circumferential surfaces of said orifice member of said partition structure and said cylindrical fixing sleeve, while said orifice member being held in abutting contact at an outer peripheral portion thereof with said shoulder so that said partition structure being positioned relative to said second mounting member in said axial direction of said second mounting member.

13. A fluid-filled vibration damping device according to claim 1, wherein at least one of said first and second annular components has an engaging protrusion formed by pressing operation, while an other one of at least one of said first and second annular components has an engaging recess formed by pressing operation, said engaging protrusion and recess being engaged with each other so that said first and second annular components are positioned relative to each other in said circumferential direction thereof.

14. A fluid-filled vibration damping device according to claim 13, wherein said first and second annular components of said orifice member being axially spaced-apart from each other to define therebetween said orifice passage extending in said circumferential direction thereof, said first and second annular components being held in close contact with each other at respective circumferential positions so as to form a blocking portion, so that said orifice passage is made discontinuous by said blocking portion in said circumferential direction thereof and extends in said circumferential direction with a circumferential length which is slightly smaller than a value corresponding to an entire circumference of said orifice member, one of said first and second annular components further including a first communication hole formed therethrough, which is located on one of circumferential opposite sides of said blocking portion for fluid communication between one of opposite ends of said orifice passage and said primary fluid chamber, while an other one of said first and second annular components further includes a second communication hole formed therethrough, which is located on the other sides of said blocking position for fluid communication between the other end of said orifice passage and said auxiliary fluid chamber, said engaging protrusion being formed at said circumferential position of at least one of said first and second annular components, while the engaging recess being formed at said circumferential position of an other one of at least one of said first and second annular components.

15. A fluid-filled vibration damping device according to claim 1, wherein said first and second annular components of said orifice member being axially spaced-apart from each other in said axial direction thereof to define therebetween said orifice passage extending in said circumferential direction thereof over an entire circumference of said orifice member, said one of said first and second annular components further including a first communication hole formed therethrough, for fluid communication between said orifice passage and said primary fluid chamber, while an other one of said first and second annular components further includes a second communication hole formed therethrough for fluid communication between the said orifice passage and said auxiliary fluid chamber, said first and second communication holes are opposed to each other in a diametric direction of said orifice passage, to thereby provide a pair of orifice passages each having a circumferential length substantially equal to a value of a half of said circumference of said orifice member, said orifice passages are formed at respective circumferential positions of said orifice member that are opposed to each other in another diametric direction perpendicular to said diametric direction.

16. A fluid-filled vibration damping device according to claim 1, wherein one of said first and second mounting members is attached to t power unit of an automotive vehicle and the other of said first and second mounting members is attached to a body of the automotive vehicle, said orifice passage being tuned to a low frequency band corresponding to a vibration of engine shakes, while said flexible rubber plate being dimensioned to be elastically deformable based on a fluid-pressure difference between said primary fluid chamber and said auxiliary fluid chamber so as to exhibit a reduced dynamic spring constant with respect to a medium or high frequency band corresponding to a vibration of engine idling.

* * * * *